United States Patent [19]
Kneller

[11] Patent Number: 4,769,892
[45] Date of Patent: Sep. 13, 1988

[54] PIPE JOINING METHOD

[75] Inventor: Dale A. Kneller, Edmonton, Canada

[73] Assignee: United Corrosion Consultants Ltd., Edmonton, Canada

[21] Appl. No.: 52,378

[22] Filed: May 21, 1987

[30] Foreign Application Priority Data

May 30, 1986 [CA] Canada ................................. 510436

[51] Int. Cl.$^4$ .............................................. B23Q 17/00
[52] U.S. Cl. ...................................... 29/407; 29/521; 29/525
[58] Field of Search ................ 29/463, 521, 525, 505; 285/93, 202, 382.7, 369

[56] References Cited

U.S. PATENT DOCUMENTS

| | | | |
|---|---|---|---|
| 3,451,119 | 6/1969 | Coberly et al. | 29/525 X |
| 4,328,983 | 5/1982 | Gibson . | |
| 4,550,937 | 11/1985 | Duret | 29/525 X |
| 4,581,816 | 4/1986 | Klufas et al. | 29/709 X |

FOREIGN PATENT DOCUMENTS

| | | |
|---|---|---|
| 1125811 | 6/1982 | Canada . |
| 435700 | 9/1935 | United Kingdom . |

Primary Examiner—Timothy V. Eley
Attorney, Agent, or Firm—Merchant, Gould, Smith, Edell, Welter & Schmidt

[57] ABSTRACT

There is disclosed a method of joining pipe sections of a given outside diameter, comprising the steps of providing a sleeve of a predetermined length and having an inside diameter slightly less than the outside diameter of the pipe section, forcing the end of one pipe section into one end of the sleeve to a distance approximately one half the length of the sleeve, to distend the one end of the sleeve radially to an extent slightly beyond the elastic limit of the material from which the sleeve is formed, forcing the end of the other pipe section into the second end of the sleeve to distend the second end of the sleeve radially to an extent slightly beyond its elastic limit while monitoring the force required to do so, and terminating forcing of the second pipe section into the second end of the sleeve when the required force as monitored starts to increase, indicating meeting of the ends of the pipe sections, whereby the contact pressure of the pipe ends is precisely regulated to ensure a correct contact pressure between the pipe ends and thus effective sealing of the pipe joint so formed.

11 Claims, 3 Drawing Sheets

PIPE JOINING METHOD

BACKGROUND OF THE INVENTION

This invention relates to pipe couplings, and specifically to methods for coupling pipes using a sleeve that is connected to the pipe sections by an interference fit.

The concept of joining mechanical elements by an interference fit is well known, and probably has historical antecedents dating back to the last century. The joining of tubular members by interference fit means is disclosed at least as early as British patent specification No. 435,700 (Mannesmann) accepted on Sept. 16, 1935.

Normally, an interference fit coupling is made by selecting one tubular element having a given outside diameter, and a second element, also tubular, having an inside diameter slightly less than the outside diameter of the first element. By mechanical means, the two elements are forced together distending the outer element. Generally, the inner element is radially compressed, and the outside element is radially distended by a given value determined by the relative inside and outside diameters.

In the above noted British specification, the inventor teaches a method of joining tubular and like members having male and female parts, comprising the step of forcing together the two members to such an extent that one or both of the members is stressed beyond its elastic limit, with a resulting permanent alteration in the shape or size of the stressed element. According to the patentee, the joints made according to the method disclosed in the British patent specification have excellent cohesive strength even when tested to destruction. However, the creation of couplings by the above means did not provide a joint capable of withstanding internal pressures, as would occur, for example, in a gas or petroleum pipeline. There remained a need for a joint that could be fabricated reliably in the field and would withstand the high internal pressures normal in pipelines without leakage or destruction.

Later attempts were made to improve the interference fit joining of pipelines and one such method is taught in Canadian Pat. No. 1,125,811, granted on June 15, 1982 (Hauk, et al).

Hauk et al provide a joint comprising a sleeve having a radially inwardly directed flange. The flange is disposed centrally in the sleeve, and pipe sections having an outside diameter greater than the inside diameter of the sleeve are forced into the sleeve by hydraulic or other means to engage the flange, there being disposed between the flange and the ends of the pipe sections gasket material intended to seal the ends of the pipe sections to the sleeve. However, Hauk et al clearly stated that the sleeve should not be stretched beyond its elastic limit. Hauk et al, therefore, appeared to be teaching that contrary to the teachings of the British patent No. 435,700 the stretching of the sleeve beyond its elastic limit was detrimental to the joint ultimately achieved.

Others have addressed the same problem in different ways. For example, Gibson in U.S. Pat. No. 4,328,983 granted on May 11, 1982 teaches a method similar to the methods taught in the specifications mentioned above, however, a sealing substance is applied to the marginal ends of the pipe prior to joining and the coupling member or sleeve is internally grooved so that the grooves engage the outside of the pipe, which is intended to provide a stronger joint. The interference fit concept forms part of the teachings of Gibson. Many others have attempted to provide interference fit joints but success has been limited in that no joining method or construction has achieved sufficiently high reliability, or ease of installation in the field, to be accepted by the pipeline industry.

SUMMARY OF THE INVENTION

The present invention seeks to overcome the disadvantages of the prior art and provides a method of joining first and second pipe sections of a given outside diameter, comprising the steps of (i) providing a sleeve of a predetermined length and having an inside diameter slightly less than the outside diameter of the pipe sections;

(ii) by mechanical means, forcing the end of the first pipe section into a first end of the sleeve to a distance approximately one half the length of the sleeve, to radially distend the first end of the sleeve to an extent slightly beyond the elastic limit of the material from which the sleeve is formed;

(iii) by mechanical means, forcing the end of the second pipe section into a second end of the sleeve to radially distend the second end of the sleeve to an extent slightly beyond its elastic limit while monitoring the force required to do so; and (iv) terminating said forcing of the second pipe section into the second end of the sleeve when the required force as monitored starts to increase, indicating meeting of the ends of the pipe sections;

whereby the contact pressure of the pipe ends is precisely regulated to ensure a correct contact pressure between the pipe ends and thus effective sealing of the pipe joint so formed.

The pipe sections may be lined with a suitable plastic material that extends from within the pipe sections and around the pipe section ends. The suitable plastic material may be an epoxy resin, and the method may further comprise the step of providing a gasket matching, in outside and inside diameters, the cross-section of the pipe ends, and of disposing the gasket between the pipe ends prior to inserting the second pipe end in the sleeve.

The plastic material may be a polyolefin, such as polyethylene, and may itself define the gasket.

The mechanical means preferably comprises hydraulic means for gripping and forcing the respective parts into engagement, and the step of monitoring the said force preferably comprises observing pressure displayed on a pressure gauge disposed in a line between a source of hydraulic pressure and the means for gripping and forcing the parts into engagement.

The gasket may comprise PTFE reinforced with glass fibre and having an etched surface.

An epoxy sealant may be applied to the pipe sections before connection of the sleeve to the pipe ends.

The inner diameter of the sleeve preferably is in the range 0.95–0.995 times the outside diameter of the pipe ends.

The material from which the pipe sections and the sleeve is formed may be a ductile metal, although the metal of the sleeve should be more ductile than the material of the pipe, one very important advantage to the system of the invention is its ability to join internally coated or lined steel pipe consistently because it does not damage the internal coating by joining. This is mainly a result of the sleeve not causing radial compression of the pipe end. The most important application is for corrosion resistant piping.

The ends of the inside surface of the sleeve are preferably chamfered.

The stretching of the sleeve defined above to just beyond its elastic limit contributes to a reliable and easily installed joint. It is thought that part of the reason for the success of the joint taught herein is the recognition that any gasket material, whether it be the pipe lining or a separate gasket, has a fairly narrow range within which it can be compressed during formation of the joint, with compression beyond that limit or below it resulting in an unsatisfactory joint. If the gasket material is compressed too much, it might fracture or otherwise be distorted beyond its ability to resist leakage. If the gasket material is not compressed enough, clearly it cannot provide a reliable seal. The step of precisely determining the extent of penetration of the pipe sections into the sleeve, with the interference fit pipe joint, increases substantially the strength and reliability of the joint above the state of the art, and results in a requirement for less skill on the part of the field workers.

BRIEF DESCRIPTION OF THE DRAWINGS

The accompanying drawings illustrate the manner in which the method according to the invention is practiced. In the drawings.

DETAILED DESCRIPTION OF THE PREFERRED EMBODIMENT

Figure 1:
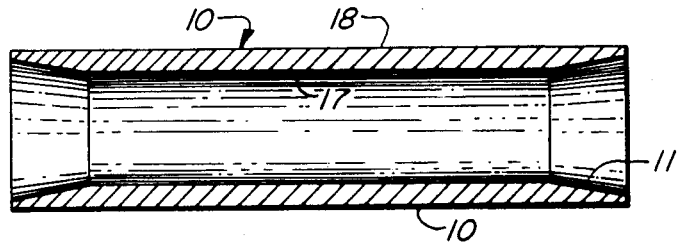
FIG. 1 is a cross-section, taken longitudinally, of a pipe sleeve.
Figure 2:
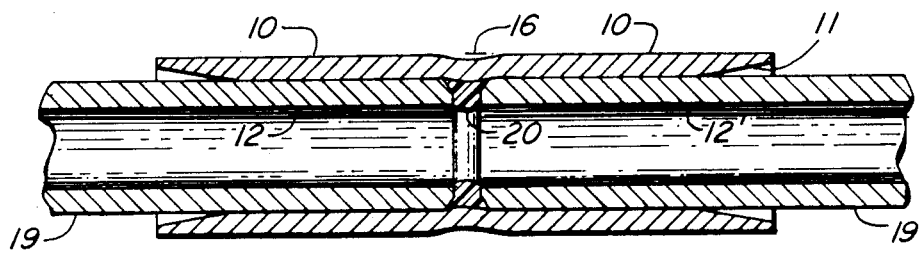
FIG. 2 is a longitudinal cross-section of a joint formed according to one embodiment of the invention.

Referring to FIGS. 1 and 2, a cylindrical sleeve 10 is formed from a material similar to but slightly more ductile than that of the pipe 19, i.e., a low carbon steel. The details and specifications for such material are well known to those skilled in the art. As will be clear from the above, the sleeve has a constant inside diameter smaller than the nominal outside diameter between its ends, which are preferably chamfered, that is of the pipe members to be joined i.e., in the range 0.95–0.995 times the pipe outside diameter. The pipe is forced mechanically into the sleeve, causing the sleeve to radially distend.

The amount of radial distension is dependent upon the outside diameter of the pipe member. Due to the tolerances allowed on the outside diameter dimensions of common pipe, the expansion will vary, but must be of a minimum value.

Figure 7:
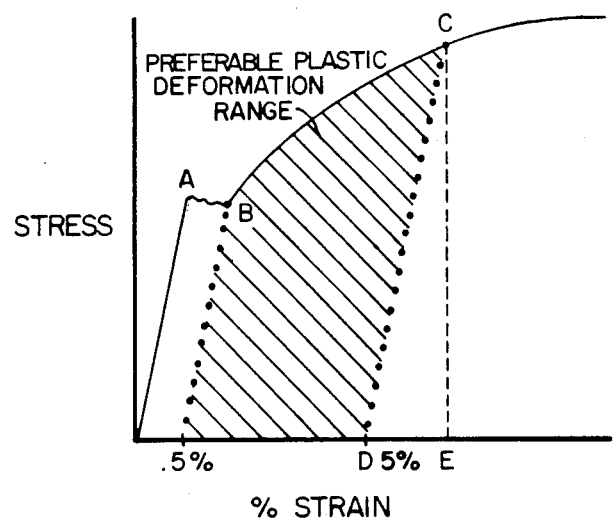
FIG. 7 is a graph illustrating the preferred range of plastic deformation.

A hoop stress created in the sleeve cannot unduly load the pipe member or cause a compressive stress in the pipe to exceed the elastic limit of the pipe. It has been found that, generally speaking, given that the radial thickness of the sleeve is approximately the same as the radial thickness of the pipe, the percentage difference between the inner diameter of the sleeve and the outside diameter of the pipe ends should be such that the inner diameter of the sleeve is in the range 0.095 to 0.995 times the outside diameter of the pipe ends, depending upon the thickness of the pipe. Referring to the attached FIG. 7, where stress is plotted against percentage strain, it will be noted that there is a sharp linear increase up to point A which represents the elastic limit of the material that is being subjected to stress, in this case the low carbon steel. There is then between the points A and B, the latter being the minimum strained value, a hiatus before plastic deformation of the material commences. According to the invention, the extent to which the sleeve is radially deformed should be beyond point B, i.e. beyond the minimum strained value, but the plastic strain to which the sleeve is subjected should not exceed the maximum strain value beyond point C to achieve a successful joint. A table of the desired sleeve internal diameters is shown below, beside the values for the outside diameters of typical pipe sections. It is not the intent of this specification to limit the invention to the precise dimensions given.

| Sleeve Inside Diameter | Pipe Outside Diameter |
| --- | --- |
| 2.320" | 2.375" |
| 3.435" | 3.500" |
| 4.425" | 4.500" |
| 6.525" | 6.625" |
| 8.500" | 8.625" |
| 10.600" | 10.750" |
| 12.575" | 12.750" |

Returning to the drawings, a typical sleeve 10 in FIG. 1, having an inner surface 17 and an outer surface 18, is circular in section, and is chamfered at 11 to facilitate entry of a pipe and 12,12'. The angle of the chamfer represents about 7° flare from the cylindrical inside surface 17 of the sleeve 10.

Figure 3:
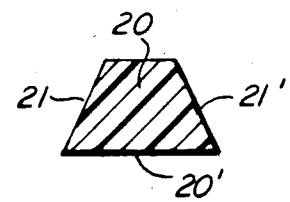
FIG. 3 is a cross-section of a typical gasket used in the embodiment of FIG. 2.

FIG. 2 illustrates a finished joint according to one embodiment of the invention. Pipe ends 12, 12' are shown after having been forcibly inserted in the sleeve 10. A gasket 20, which preferably is formed from polytetrafluoroethylene, reinforced with glass fibre and having an etched surface, is disposed between pipe ends 12 and 12'. A section of the gasket is shown in FIG. 3, and the outside surface 20' of the gasket 20 has a diameter approximately equal to the outside diameter of the pipe 12, 12' while the inside diameter of the gasket 20 is slightly greater than the inside diameter 15 of the pipe 19. The shape of the gasket 20 is altered, as will be clear from FIG. 2, by insertion of the pipe ends 12,12' into the sleeve 10.

It will be noted from FIG. 2 that due to insertion of the pipe ends 12,12' into the sleeve 10, the latter is radially distended by an amount 16 approximately corresponding to the difference between the inside diameter of the sleeve and the outside diameter of the pipe.

Figure 2A:
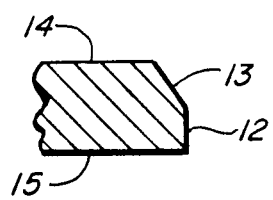
FIG. 2a is a detail view of a typical pipe end.

A typical pipe end detail appears in FIG. 2a. The outside surface 14 of the pipe is bevelled at 13; the end 12 of the pipe is normal to the axis of the pipe. The inside diameter 15 of the pipe, of course, is parallel to the outside surface 14. The angle of the bevelled surface 13 relative to surface 12 is normally 30°+5°.

The joint is formed by first preparing the outside surface of a pipe end 12, 12', for example by brushing, to remove undesirable material. Then, the pipe ends are coated with a suitable epoxy sealant in fluid form. In the preferred embodiment, the sleeve 10 is firmly secured, in a suitable clamping means, and the pipe end 12 or 12' is grasped by a clamp secured to hydraulic means capable of forcing the pipe end 12 or 12' into the sleeve 10. Normally, the outside surface 14 of a first pipe end is marked to represent approximately one half of the length of a sleeve, and the force fit of the pipe end into the sleeve is continued until the mark reaches the end of the sleeve. Movement is then terminated, and a similar step is taken with the second pipe end. It should be noted that as a result of radial distention, the chamfered end of the sleeve turns slightly inwardly. (not shown).

Figure 5:
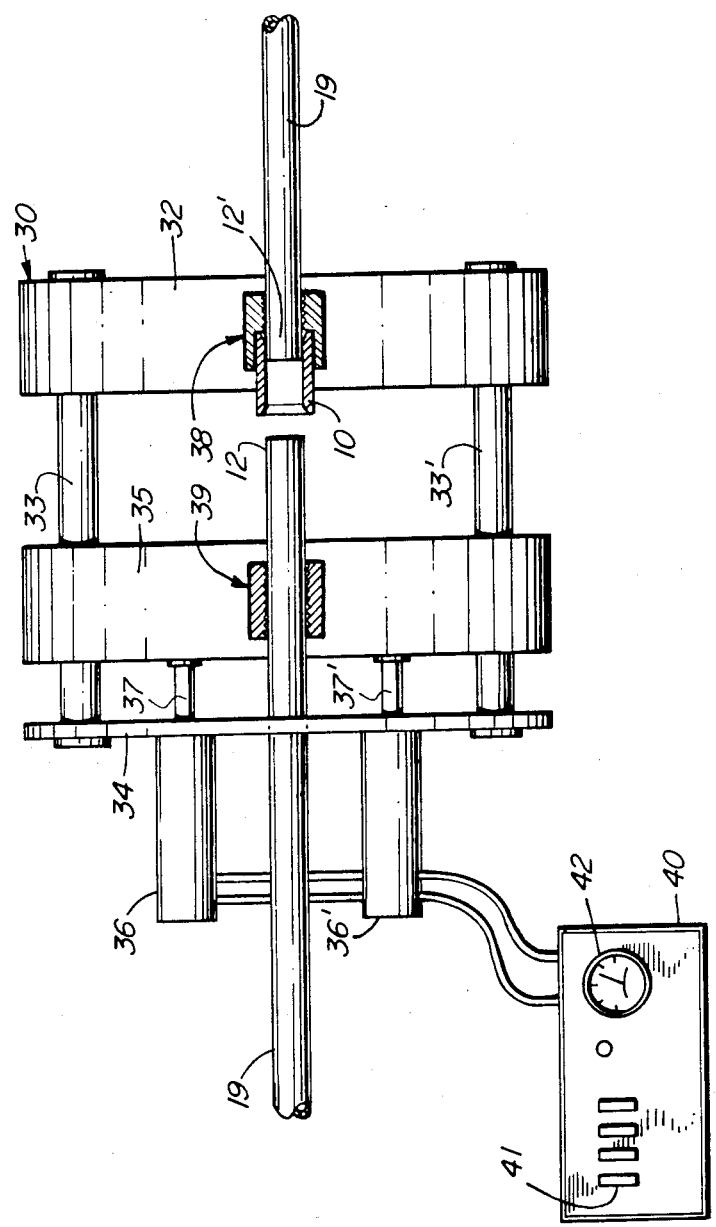
FIG. 5 is a schematic illustration of a machine for joining pipe according to the method of the invention.
Figure 6:
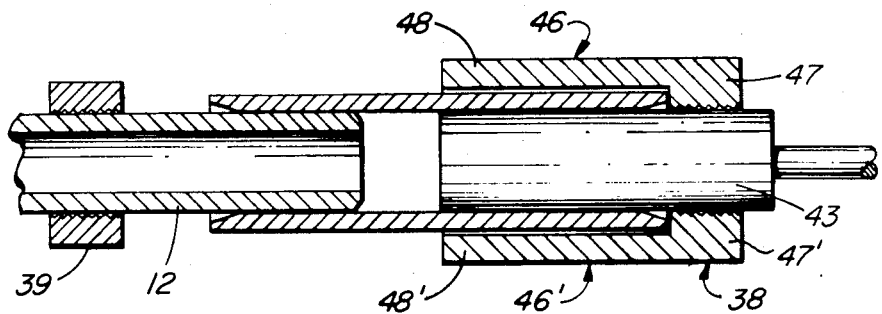
FIG. 6 is a detail view showing a portion of the machine illustrated in FIG. 5.

Turning now to FIGS. 5 and 6, there is illustrated in schematic form a machine suitable for carrying out the invention. A machine frame 30 comprises a transverse element 32 to which there are firmly secured shafts 33, 33'. Opposite the machine frame element 32 is a yoke 34 connecting the ends of the shafts 33, 33'. Secured to the yoke 34 are hydraulic cylinders 36, 36' from which extend piston rods 37 37', in turn secured to a slidable element 35 that is adapted to slide along the shafts 33, 33'.

On each of the elements 32 and 35 are mounted jaw means 38, 39 respectively. These may be hydraulically or mechanically actuated to grip a pipe or coupling. Referring specifically to FIG. 6, the jaw means 38 is shown as comprising coupling jaws 46, 46' having clamping portions 47, 47' each having axially extending sleeve elements 48, 48' for a purpose to be described below.

In operation, a length of pipe 19 having an end 12 or 12' is gripped securely by the jaws 39 on the slidable element 35. A sleeve 10 is placed between the sleeve elements 48, 48' of the jaw means 38 and is located in precise axial alignment by a tool 43 of cylindrical configuration which is gripped securely by the jaw elements 47, 47'. The controls 41 on the control panel 40 are manipulated to apply hydraulic pressure to the cylinders 36, 36', causing movement of the element 35 to the right as shown in the Figure. The pipe end 12 is marked at a point corresponding to approximately one half of the length of the sleeve 10, and movement of the hydraulic cylinders is continued until the mark is adjacent the end of the sleeve 10 that is to the left in the Figure. Movement of the hydraulic cylinders is then terminated, and the jaws disengaged. The machine is rotated through 180°, the element 35 is retracted and a second pipe section is placed opposite the assembled first pipe section 12 and sleeve 10.

In the next stage of the process, that is, the stage illustrated in FIG. 5, a second length of pipe is gripped by the jaws 39, and the length of pipe to which the sleeve has already been coupled is gripped by the jaws 38. The sleeve portions 48, 48' of the jaws 38 are so positioned that the sleeve abuts the jaw portions 47, 47' so that the sleeve is effectively locked on the section of pipe upon which it has first been installed. Then, the hydraulic cylinders are again activated to force the second pipe section into the sleeve. During this portion of the operation, the operator will carefully observe the pressure indicated on the gauge 42, the latter being in the hydraulic line between the source of hydraulic pressure (not shown) and the hydraulic cylinders 36, 36'. It will be appreciated that once the amount of hydraulic pressure necessary to force the second pipe section into the sleeve is established, and movement of the second pipe section into the sleeve continues, once the two pipe ends abut via gasket material the pressure in the hydraulic system will start to increase. It is this increase that gives the operator an indication of when abutment of the pipe ends has been effected, and thus indicates the appropriate point at which the supply of hydraulic fluid must be terminated to avoid damage to the gasket material.

Figure 4:
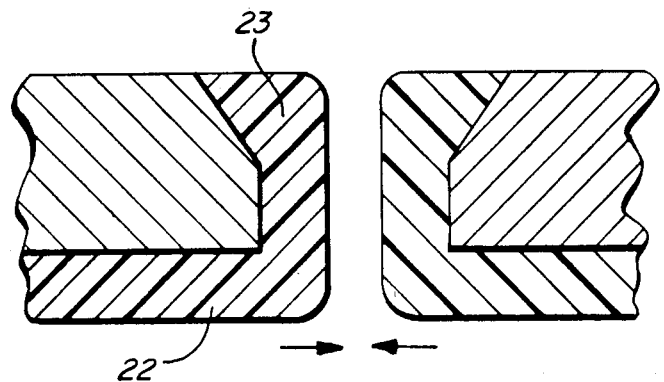
FIG. 4 is a detail view of opposed pipe ends during the formation of joints according to an embodiment of the invention.

The above described point at which the hydraulic pressure is terminated has to be determined by the materials that are used. If, for example, a hard PTFE gasket 20 is used, and the pipe is of the type lined with a thermosetting epoxy resin, the desirable contact pressure would be different compared with a softer gasket material. For example, if the pipe is lined with polyethylene as shown in FIG. 4, with the polyethylene liner 22 coating the surfaces 12 and 13 of the pipe end, since the polyethylene is a material softer than the PTFE of the gasket 20 the characteristics and dimensions of the materials will determine that the upper limit of the hydraulic pressure that can be supplied is different from the upper limit in the case of use of a PTFE gasket with an epoxy lined pipe. It will be appreciated that it can readily be established by testing samples (a) the amount of hydraulic pressure that is required to effect mating of the pipe ends and the sleeve and (b) the amount by which that pressure has to be exceeded when the pipe ends abut.

While an hydraulic machine has been described as suitable for carrying out the steps according to the invention, clearly mechanical means can also be used. The clamps 38 and 39 may be mechanically or hydraulically actuated, and the hydraulic cylinders can be replaced with screwjacks or any suitable means for moving the element 35.

What I claim as my invention is:

1. A method of joining first and second pipe sections of a given outside diameter into a pipe joint, comprising the steps of:
   (i) providing a sleeve of a predetermined length and having an inside diameter slightly less than the outside diameter of the pipe section;
   (ii) by mechanical means, forcing the end of the first pipe section into one end of the sleeve to a distance approximately one half the length of the sleeve, to distend the one end of the sleeve radially to an extent slightly beyond the elastic limit of the material from which the sleeve is formed;
   (iii) by mechanical means, forcing the end of the second pipe section into the second end of the sleeve to distend the second end of the sleeve radially to an extent slightly beyond its elastic limit while monitoring the force required to do so; and
   (iv) terminating said forcing of the second pipe section into the second end of the sleeve when the required force as monitored starts to increase, which indicates meeting of the ends of the pipe sections, thereby regulating the contact pressure between the pipe ends to ensure effective sealing of the pipe joint.

2. The method defined in claim 1 wherein the pipe sections are lined with a suitable plastic material that extends from within the pipe sections and around the pipe section ends.

3. The method defined in claim 2 wherein the plastic material is an epoxy resin, and further comprising the step of providing a gasket matching, in outside and inside diameters, the cross-section of the pipe ends, and disposing said gasket between the pipe ends prior to carrying out step (iii).

4. The method defined in claim 3 wherein the gasket comprises polytetrafluoroethylene reinforced with glass fibre and having an etched surface.

5. The method defined in claim 2 wherein the plastic material, is polyethylene and itself defines a gasket.

6. The method defined in claim 1 wherein the mechanical means comprises hydraulic means for gripping and forcing the respective parts into engagement, and the step of monitoring the said force comprises observing pressure displayed on a pressure gauge disposed in a line between a source of hydraulic pressure and the means for gripping and forcing the parts into engagement.

7. The method defined in claim 1 wherein an epoxy sealant is applied to the outside of the pipe ends before connection of the sleeve to the pipe ends.

8. The method defined in claim 1 wherein the inner diameter of the sleeve is in the range 0.95–0.995 times the outside diameter of the pipe ends.

9. The method defined in claim 1 wherein the material from which the pipe sections and the sleeve is formed is a ductile metal.

10. The method defined in claim 1 wherein the ends of the inside surface of the sleeve are chamfered.

11. The pipe joint formed according to the method of claim 1.

* * * * *